United States Patent [19]

Behr

[11] 3,852,386
[45] Dec. 3, 1974

[54] MANUFACTURE OF FILM HAVING FORMED FASTENER MEANS THEREIN

[75] Inventor: Raymond D. Behr, Midland, Mich.

[73] Assignee: The Dow Chemical Company, Midland, Mich.

[22] Filed: Jan. 3, 1972

[21] Appl. No.: 214,835

Related U.S. Application Data

[63] Continuation-in-part of Ser. No. 99,782, Dec. 21, 1970, abandoned.

[52] U.S. Cl............ 264/40, 264/89, 264/95, 264/177 R, 264/209, 264/210 R, 264/237, 264/348
[51] Int. Cl............ B29d 7/22, B29d 23/04
[58] Field of Search ... 264/237, 95, 89, 209, 177 R, 264/167, 40, 103, 288, 348, 210 R

[56] References Cited
UNITED STATES PATENTS

| | | | |
|---|---|---|---|
| 3,038,205 | 6/1962 | Plummer | 264/177 R |
| 3,195,184 | 7/1965 | Svec | 264/95 |
| 3,274,317 | 9/1966 | Batosti et al. | 264/237 |
| 3,320,340 | 5/1967 | Luca | 264/95 |
| 3,355,531 | 11/1967 | Barnhart et al. | 264/95 |
| 3,469,282 | 9/1969 | Barnes | 264/95 |
| 3,503,112 | 3/1970 | Siegel | 264/95 |
| 3,539,669 | 11/1970 | Chein-Ho | 264/95 |
| 3,700,763 | 10/1972 | Van Kralingen | 264/95 |

FOREIGN PATENTS OR APPLICATIONS

| | | | |
|---|---|---|---|
| 1,286,216 | 4/1961 | France | 264/209 |

Primary Examiner—Jeffery R. Thurlow
Attorney, Agent, or Firm—Burke M. Halldorson

[57] ABSTRACT

This disclosure relates to the art of extruding plastic tubular film of the type having circumferentially spaced apart, thickened sections or profiles which extend continuously in the axial direction, and which are configured to interlock mechanically to provide a zipper-like fastener integrally formed in the film. Such film is extruded as a bubble or tube supported by internal air pressure, and in the preferred practice, is shortly after extrusion, captured between a pair of elongated racks such as of aligned rollers which are air-cooled or otherwise cooled. The racks serve to engage and draw heat rapidly out of the profiles to avoid certain disfigurations therein, can be used to control the hoop tension in select areas of the bubble, and are compatible generally with maintaining a stable bubble.

4 Claims, 5 Drawing Figures

MANUFACTURE OF FILM HAVING FORMED FASTENER MEANS THEREIN

This application is a continuation-in-part application of my copending application Ser. No. 99,782, filed Dec. 21, 1970, now abandoned.

BACKGROUND OF THE ART

The present invention relates to the art of extruding plastic tubular film of the type having circumferentially spaced apart, thickened sections or profiles which extend continuously in the axial direction, and which are configured to interlock mechanically with each other, and thereby form a zipper-like fastener integral with the film. As a typical example of such film, one of the fasteners referred to herein as a bead or rib member, is normally arrowhead-shaped including an enlarged head portion, and a stem which attaches the head portion to the film. The opposite fastener, referred to herein as a groove, may comprise spaced apart arms which together define a gap in which the indicated head portion is received. The outer extremities of the arms are normally made to hook inwardly to firmly lock the head portion within the gap.

Customary pratice is to extrude such film as an elongated tube or film bubble supported by internal air pressure. The main portion of the film, since it is relatively thin, will be substantially cooled and solidified at a region not too far from the point of extrusion. The thicker profile areas thereof, however, even though extra cooling air is usually supplied selectively thereon, will remain molten or semi-molten for a longer period. This phenomena is usually visually detectable by observing the film frost line which in usual practice, normally settles relatively close to the extrusion die, in contrast to the frost line of the profiles which occurs much more remotely therefrom.

The problem specifically in manufacturing the above film, is that the groove tends to collapse, that is, the arms of the groove come together thereby closing or partially closing the groove and making it unusable. Also, there may be excess thinning adjacent the base of one or more of the profiles. Normally the problem will start to become particularly critical when the manufacturing rate exceeds about 75 to 80 feet per minute.

The above profile disfigurations are herein attributed principally to hoop tension in the film, created by the internal pressure supporting the same, and such disfigurations apparently occur as the film travels between the aforenoted frost lines. That is, the discrepancy in cooling rates results in early solidification of the film, while the profiles are still partially liquid, in turn, causing disfiguration of the profiles by hoop tension up until the time the profiles become hardened or solidified.

In my copending application Ser. No. 99,782, filed Dec. 21, 1970, now abandoned, I have disclosed that such problems, which are encountered particularly in the high speed manufacture of this film, can be minimized by lowering the air pressure surrounding the film at the region between the die head and the film frost line. By utilizing this technique I was able to maintain the film bubble with a lower differential pressure in the areas between the film frost line and profile frost line, and consequently significantly relieved the hoop tension in the film at time periods while the profiles were still molten. In any event, I found that through the above technique, I could better control the amount the groove closed, and the tendency of the film to thin down excessively in the profile areas.

This invention can be used in combination with the above, or separately thereof, and in one form of its practice has the effect of even further reducing the hoop tension in the film. Also the present invention provides a practical means for, and conceives of "freezing" or rapidly solidifying the profiles at a point before hoop tension has the effect of objectionably disfiguring the profiles. The aforegoing is accomplished with very little additional equipment and operating expenses in and above that already a part of the manufacturing cost of this film.

Accordingly to provide an improved cooling system for manufacturing the indicated film, wherein with little additional cost, better and effective control of the profile areas of the film is achieved, is a primary objective of this invention.

It is a further objective of this invention to provide with the above, using the same equipment as is employed in accomplishing the above, and effective means for reducing hoop tension in the extruded film.

It is also an objective of this invention to teach a way and means of manufacturing the aforenoted film at maximum speed, while still retaining good control in and to certain critical dimensions of the profiles thereof, as must be observed to manufacture a workable fastener in such film.

BRIEF SUMMARY OF THE INVENTION

As a brief summary then, the present invention contemplates an improvement in manufacturing film of a type carrying profiles, particularly fastener profiles therein, and wherein in the preferred form of the invention, the film shortly after it is extruded, is captured between opposed racks of aligned rollers which are cooled by air or otherwise. The profiles, by means of the cooling racks, are quickly "frozen" or solidified to a degree that the same are rendered substantially non-sensitive to hoop tension, as well as other profile distorting forces as may exist in the film. As even further advantage, and without additional equipment expense, the distance between the cooling racks can be controlled to have a flattening effect on the film, which has been found to reduce the hoop tension therein for any given air pressure supporting the film. Thus the disturbing effect of hoop tension on the profiles is further held in check, and all of the above is accomplished, as will be explained in more detail hereinafter, in a manner compatible with insuring a stable bubble or inflated film tube. As is readily understandable, the invention is susceptible to various modifications within the broad teachings hereof, particularly as to the equipment utilized to gain the advantages of the invention, as will become evident by reference to the further disclosure herein which follows.

BRIEF DESCRIPTION OF THE DRAWINGS

The preferred embodiment of the invention is shown in the accompanying drawing wherein wheresoever possible like reference numerals designate corresponding materials and parts throughout the several views thereof in which.

DESCRIPTION OF THE PREFERRED EMBODIMENTS

Figure 2:
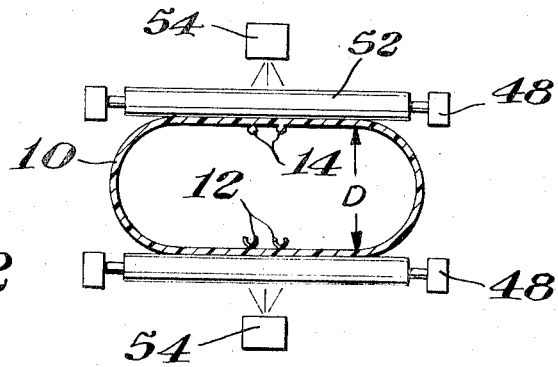
FIG. 2 is a cross sectional view of freshly extruded and partially flattened profile carrying film taken along reference line 2—2 of FIG. 1.
Figure 3:
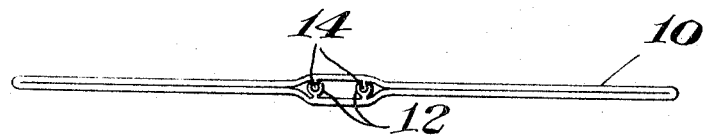
FIG. 3 shows film of like character to that of FIG. 2, but with the profile fasteners therein being in the occluded or interlocked position.

Referring now more particularly to the drawings, the film to be manufactured is shown in cross-section in FIG. 2, as indicated generally by reference numeral 10, and includes longitudinally continuous profile fasteners which may comprise more than one mating set if desired. For example, the film can incorporate or carry a pair of hollow groove elements 12, and a pair of rib elements 14. The groove and rib elements mechanically interlock as shown in FIG. 3 to provide a film, which by slitting longitudinally between the mated fasteners, and cross sealing, is made into bags incorporating an integral fastener means therein.

Figure 1:
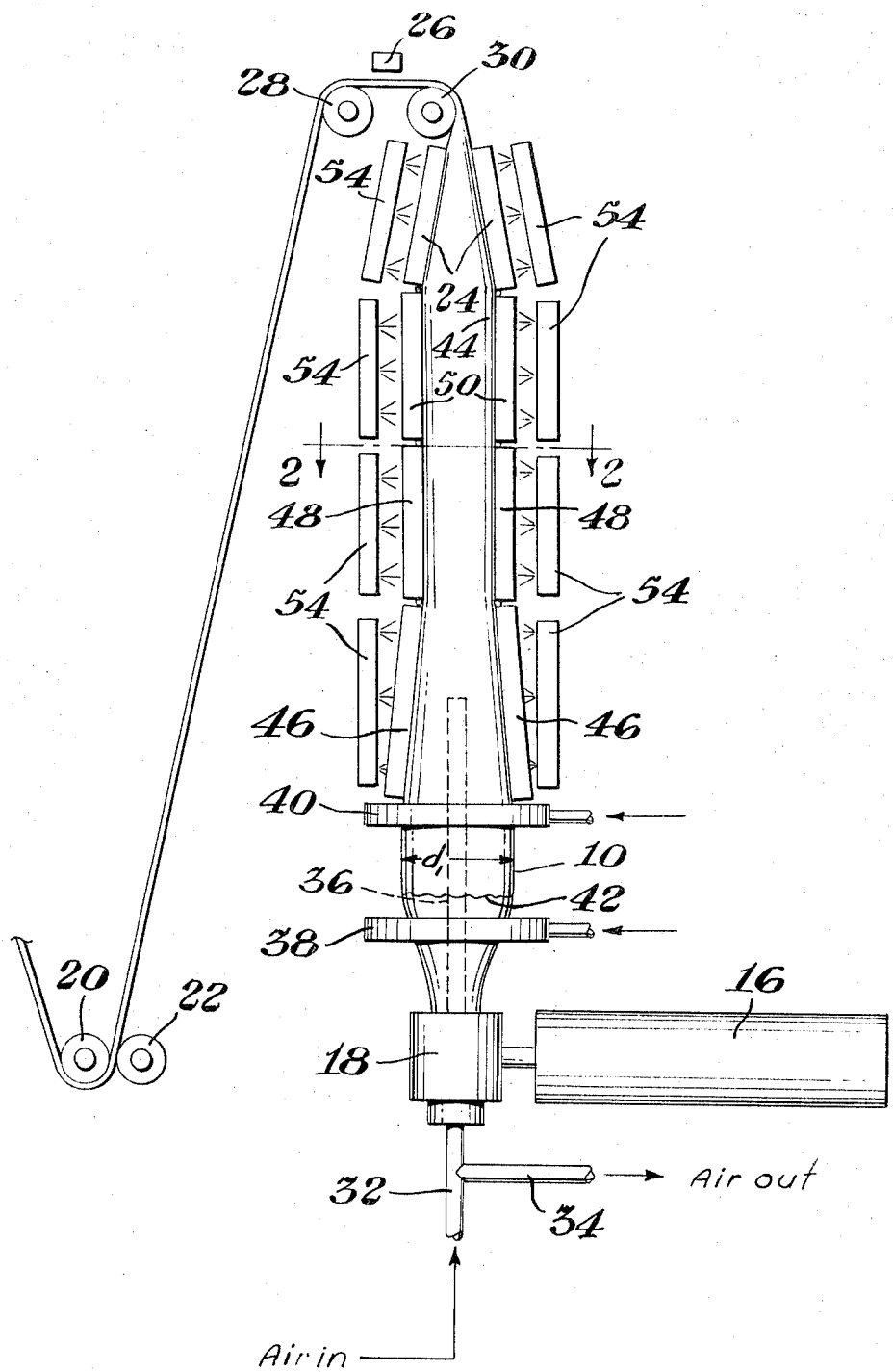
FIG. 1 is an elevational view, portions of which are generally schematic in nature, and which represents and illustrates a process and apparatus for manufacturing profile carrying film in accordance with the general teachings and principles of this invention.

The process and apparatus for this manufacture is shown in FIG. 1, and includes an extruder or extrusion chamber 16 which is adapted to receive a plastic material such as in pellet form, heat plastifying it, and then deliver it under pressure to a die head 18, from which the plastic eventually emerges in the form of a tubular film envelope or bubble, i.e., film 10.

After it leaves the die head, and at a point quite remote therefrom, the film is grasped and continuously pulled by drive rolls 20 and 22. The drive rolls, as a preferred practice, are operated at a sufficient rate with respect to the rate of extrusion, to stretch the film in the longitudinal direction, causing it to thin down from its extruded width or gauge, such stretching occurring in the molten or partially molten region of the film, that is, adjacent to and just above the die head. Additionally, it is possible to stretch or expand the film circumferentially by means of air pressure fed internally thereto, and which is trapped by collapsing the film such as by use of a collapsing rack 24 placed remote from and above die head 18.

The pressure within the film can be controlled automatically by means of a film measuring device 26 which is positioned between a pair of spaced apart idler rollers 28 and 30 over which the film is fed flatly after it leaves collapsing rack 24. Device 26 continually measures the lay flat width of film 10, and responsive to such measurements, controls the amount of air being fed internally thereto such through an air inlet pipe 32, connecting into the bottom of die head 18, thus ultimately controlling the size of the extruded film via controlling the pressure within the bubble.

It has been the usual practice prior to this invention to refrigerate the air going through inlet pipe 32, and recycle it out through an outlet pipe 34, while maintaining the desired pressure within the film. By this technique, using an extended vertical pipe 36 disposed internally within the film, and which is fed by air inlet pipe 32, the incoming air can be continually and selectively directed onto the profiles to speed the solidification of such heavier regions of the film. Also a pair of air cooling rings 38 and 40, located in spaced apart relationship above the die head, supply cooling air, again preferably refrigerated, continuously and circumferentially to the film almost immediately after it is extruded. Even in supplement to this, it has been the practice to supply additional cooling air selectively and externally to the profile fasteners at regions above the cooling rings as shown in some detail in U.S. Pat. No. 3,320,340.

Despite all of the above cooling measures, the cooling system as shown and described so far, has certain critical limitations. Particularly the profiles do not cool sufficiently fast to avoid certain disfigurations therein which occur as the film travels between the frost line of the main body of the film, this residing in the lower part of the film train, such as for representative purposes, as is shown by line 42, and the frost line of the profiles which is usually much higher and which I have arbitrarily noted as existing at or about line 44. I have attributed such disfigurations (which can start to become critical particularly at manufacturing speeds over about 75 to 80 feet per minute) to hoop tension in the film at time periods when the profiles are in molten or partially molten condition, while the main body of the film has solidified or substantially so. This is essentially the region between the aforenoted frost lines. Also with direct air cooling, the great volume of air required to be forced against the film, especially with attempts to increase manufacturing speeds, tends to reflect adversely on the stability of the bubble causing it to flutter or move about, and might even result in breaking off of the film.

The use of a cooling rack provided in hinged sections 46–50, and in turn hinged to the bottom of collapsing rack 24, I have found to significantly overcome the above limitations and problems. The construction of the cooling rack is inexpensive, and can comprise essentially aligned, smooth metal rollers 52, freely rotatable, and which are arranged to contact and "ride" against the profiles, as shown in FIG. 2, and upon which cooling air is directed by means of external vertical pipes or conduits 54. The pipes 54 are aligned to force air, preferably refrigerated, to the select region of the cooling racks which are in contact and/or in near proximity to the molten profiles. I have found such an arangement to be so efficient in setting or cooling the profiles, that in manufacturing speeds as, for example, at 100 feet per minute, the profiles are manufactured without objectionable disfiguration. Also, while it is difficult to view because of the visual obstruction of the cooling racks, it appears that the cooling racks significantly lower the frost line of the profiles, per a given operating speed. Moreover, by use of the cooling racks 46–50, which desirably extend downwardly to or about as near to the lower frost line 42 as is practicable, the film is intimately hugged on each side, whereby the cooling racks stabilize or assist to stabilize the lateral movement and/or generally fluttering of the film. The latter can be a problem caused at least in part by large amounts of cooling air impinging directly on the film.

As another facet to the invention, and particularly when manufacturing speeds are increased greatly such as significantly above 100 feet per minute (i.e., 125 to 150 feet per minute and above), cooling racks 46–50 can automatically compensate for such greater speeds, not only through increasing the feed of air through pipes 54 to maximize the cooling efficiency of the racks, but also by bringing the racks closer together so as to have a flattening effect on the film. Despite the "seemingly" greater pressure or force bearing externally on the film by readjusting the cooling racks in this manner, it has been found that such readjustment effectively and substantially reduces the hoop tension in the bubble.

In this latter embodiment therefore, the cooling racks can have a double barrel effect. The same provide remarkably efficient cooling in the area between the film frost line and profile frost line, and additionally, selectively reduce hoop tension in the film at least insofar as the areas of the bubble that are flattened thereby.

The amount of such reduction in hoop tension I believe is substantially in direct proportion to the reduction in the diameter of the film, as denoted by "D" in FIG. 2, assuming, of course, other conditions are constant. For example, a decrease in "D" of 10 percent from original, occasions I believe a decrease in hoop tension, selectively as to the area flattened by a corresponding amount of approximately 10 percent. By further decreasing "D" as, for example, by 20 percent, 30 percent, 40 percent, 50 percent, and so forth, hoop tension can be further progressively and significantly reduced by the amount corresponding to such reduction in the value "D."

EXAMPLES

By way of a further and specific illustration of the invention, profile carrying film is manufactured according to the teachings above and under conditions wherein the variables of manufacture are maintained substantially constant except for the region at which the cooling racks are permitted to contact the film. This is accomplished by holding the lower portions of the racks sufficiently apart so that only the upper portions of the racks contact the film, which is then followed (or preceded) by bringing the racks closer together so that the point of their contact with the film is gradually lowered. The manufacturing rate is about 100 feet per minute. Polyethylene, with small amounts of blended additives, is used as the film forming polymer.

The middle section 48 of the cooling rack, employed in these Examples, is 10 feet in length; and the like dimension of the top section 50 is 7 feet; and that of the bottom section 46 is 5 feet. The rollers 52 are about 2 inches in diameter, set on an axis-to-axis spacing of about 2.4 inches in each section. The collapsing rack is 6 feet in length, and the height of the bubble is about 31 feet. The diameter of the bubble, as taken at $d_1$ in FIG. 1, is approximately 5.6 inches, and its lay-flat width is approximately 8-13/16 inches. The gauge of the film at regions remote from the profiles, is about 1.8 mils within a tolerance range of about 1.5 to 2.1 mils. The gauge of the profiles in the interlocked position, and including the film on each side thereof, is roughly about 50 to 70 mils. The cooling parameters are maintained substantially constant and are at a level of efficiency roughly in accordance with prior practice including the general volume and temperature of the air that is directed through the lower six pipes 54 (in prior practice the air through these pipes was forced directly onto the film rather than onto the cooling racks).

In one run, under the above conditions, the racks are permitted to contact the film at a height of approximately 13 feet above the die head. Film manufactured with the racks in such position is examined by cutting through the film and examining the groove profile as magnified 50 times. The condition of the profile so manufactured is roughly approximated in FIG. 4, and as can be readily observed, the opposed arms 56 and 58 of the profile 12 are nearly in contacting association, indicating that the groove has collapsed to a point where it is unacceptable as a cooperating fastener member. The value "X" indicated in FIG. 4 measures the width of the opening into the groove and is approximately about 0.12 inches as magnified 50 times, which translates to an actual value of about 2.4 mils.

By readjusting the cooling racks the film is also tested for its response to the condition where the racks engage the same at the progressive distances of 11, 8, 6 and approximately 2.8 feet above the die head. The response of the groove to such changes is progressive, that is, the value "X" gradually increases from about 4 to 5.6, to 7, and finally to 11 mils with the racks being at the nearest point, that is, at approximately 2.8 feet above the die head. The profile obtained at the 2.8 foot position is shown in rough approximation in FIG. 5, as magnified 50 times, and exhibits remarkable differences to and improvement over the profile illustrated in FIG. 4.

Figure 4:
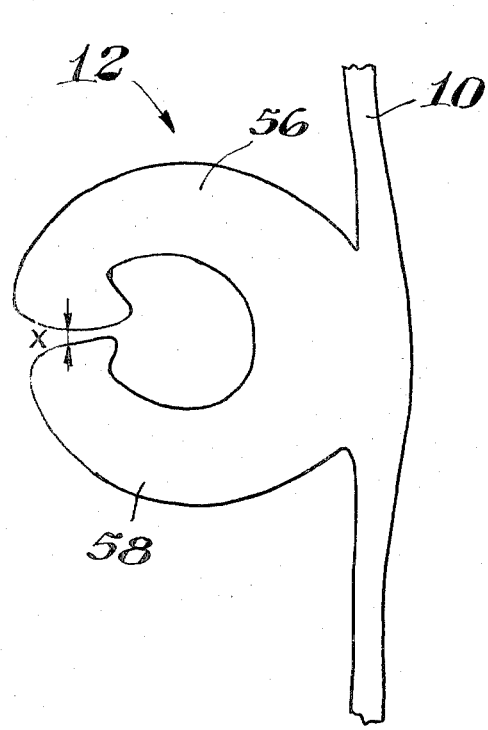
FIGS. 4 and 5 are greatly magnified views of a groove profile showing the response of such to certain manufacturing conditions as set forth in some detail in Example 1 hereof.
Figure 5:
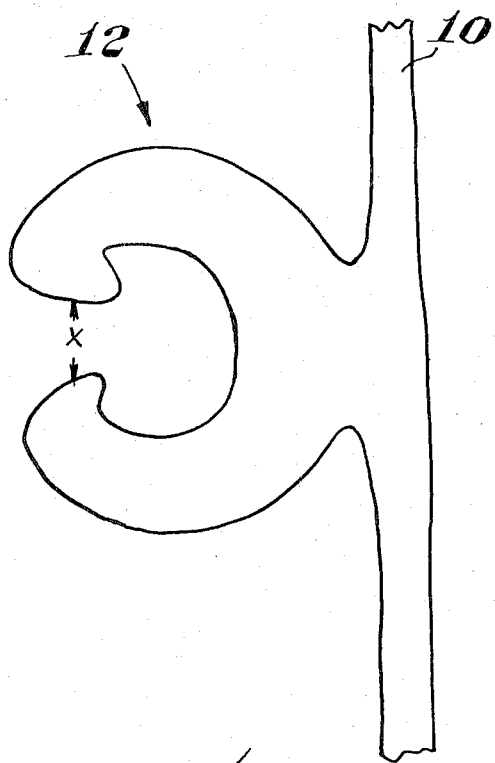

It is also observed that even though the cooling racks contact, and continue in contact with the profiles at regions where the latter are molten or semi-molten, such pressure does not appear to disturb or damage the film in the region of such profiles as is evident upon examination of the profiles of FIGS. 4 and 5 hereof.

Other tests are run under generally like conditions, but wherein the points of contact are varied from 14 feet to 11 feet to 8 feet to 6-½ feet, and at the closest point to about 2.8 feet above the die head.

At the 14 feet height, the groove is approximately totally collapsed showing a spacing "X" of only about 0.6 mils; at 11 feet, such spacing increases to approximately about 3.8 mils; at 8 feet it increases further to about 5 mils; at 6-½ feet it yet further increases to about 7.6 mils; and with the racks only about 2.8 feet from the die head, the maximum spacing "X" is obtained which is about 10.4 mils.

In all of the above tests the flattening effect, while slightly variable in the different runs, is purposely maintained at a relatively minimal level to observe the response of the groove profile selectively as to the cooling effect of racks 46–50.

By way of yet further illustration of the invention, tests are conducted to demonstrate the response of the groove profile selectively as to the flattening effect of sections 46–50. The apparatus employed is generally similar to the above, except that the cooling racks and the collapsing rack are orientated in a manner so as not to contact the profile. This isolates the response of the groove profile to what is obtainable from the flattening effect. As with all tests herein, one line of pipes 54 is deleted since but one set of profiles is to be extruded with the film; and in the instant tests, the remaining line of pipes 54 is aligned to force air directly onto the profiles because of the indicated orientation of the racks.

In the results of one run above, the opposed parts comprising middle section 48 are set in parallel relationship at about 5.5 inches apart, or just slightly less than the diameter of the bubble at $d_1$. The lower section 46 is essentially open, but may be used to slightly collapse the film to avoid an abrupt change in the diameter of the film. The resultant profile shows collapse to an extent that it is unusable, and the film adjacent one side of the profile exhibits some excess thinning.

The results in another such run are obtained using like manufacturing parameters, except that the middle section 48 is adjusted to gradually converge upwardly from a spacing of about 5.5 to about 3.25 inches, causing a corresponding gradual flattening of the film as it proceeds through the length of the middle section. The profile obtained under these conditions shows significantly less collapse, (spacing "X" is about 8 mils), but still exhibits some slight but not to objectionable thinning of the film in the area thereof adjacent one side of the profiles.

In another such run, the opposed parts of the middle section are also placed in parallel relationship, but at a spacing therebetween of about 3.25 inches. The profile in this latter instance shows even further response to the increased degree of flattening (spacing "X" is about 11.4 mils), and the extent of thinning of the film, if any, is within acceptable limits.

The above demonstrates a significant positive response and control of the ultimate configuration of the groove profile, as well as film thinning, can be achieved through the step of flattening the film as it travels between the aforesaid frost lines; by cooling the profiles through contact with rollers 52 or equivalent means; or by a combination of both of the above. Obviously the extent of such control measure, if optimum advantage is to be taken thereof, must be made responsive to the operating parameters under which the film is manufactured. To maximize the response, however, the flattening and cooling effects can be extended downwardly to near the film frost line 42, as discussed generally above.

While certain representative embodiments and details of this invention have been shown and described to illustrate the basic principles, teachings and operations thereof, it will be apparent to those skilled in the art that various modifications may be made therein, particularly to the apparatus used to affect the results of the invention.

For example, the cooling racks might comprise thin sheets of metal or of other like heat conductive or dissipating material which engage the film and upon which cooling air, water, or a like cooling medium is directed to control the resultant configuration of the groove profile of the manufactured film. Moreover, it is readily apparent that the invention is more broadly applicable than to a particular groove profile configuration as, for example, it may be applied to control any profile configuration wherein there is spaced apart arms, projections or the like which exhibit a tendency to collapse when incorporated in tubularly extruded film.

What is claimed is:

1. In a method of manufacturing film, the steps of:
   a. continuously extruding a seamless tube of film while providing pressure internally to the tube, and then collapsing the moving tube at an area remote from the point of extrusion,
   b. integrally extruding with the tube, a first thickened profile defining a continuous gap the width of which is sensitive to hoop tension in the tube during a period of its manufacture, and at least a second thickened profile spaced circumferentially from the gap defining profile and adapted to be interlockingly receivable in said gap by means of cooperative sizing and configuration between the profiles, said profiles extending continuously in the direction of extrusion along the inner surface of the tube,
   c. clasping the tube between opposed racks of heat conductive roller means for a substantial extent of the area between the film frost line and the frost line of the profiles, said roller means rotatably engaging opposite sides of the moving tube, and externally contacting the area comprising the base of the gap defining profile at a time in the process when the ultimate gap width is sensitive to hoop tension, and
   d. cooperatively with step (c), cooling the rotating roller means to withdraw heat from said base area, said heat withdrawal step being practiced at a rate to control the width of the gap defining profile with respect to the size of the profile receivable therein, to thereby establish a proper interlocking relationship between said profiles.

2. The method of claim 1 wherein step (d) comprises issuing a cooling gas stream onto the rotating roller means, to cool the surface of the roller means and transfer such cooling effect to the film.

3. The method of claim 1 wherein said film is manufactured at a rate of at least 75 feet per minute.

4. The method of claim 3 including the additional step of partially flattening the tube over at least part of the region existing between the film frost line and the frost line of the profiles, to a sufficient extent to contribute in preventing undue collapse of the gap by reducing hoop tension in the film at a time when the width of the gap is significantly sensitive thereto, said flattening step being practiced through means of adjusting the spacing between said racks of rotating roller means.

* * * * *